United States Patent [19]

Stobb

[11] 4,148,391
[45] Apr. 10, 1979

[54] ACCUMULATOR AND CONVEYOR FOR A ROW OF ITEMS

[75] Inventor: Walter J. Stobb, Pittstown, N.J.

[73] Assignee: Stobb, Inc., Clinton, N.J.

[21] Appl. No.: 842,546

[22] Filed: Oct. 17, 1977

[51] Int. Cl.² .............................................. B65G 47/26
[52] U.S. Cl. ..................................... 198/431; 198/531
[58] Field of Search ............... 198/431, 433, 422, 436, 198/503, 531; 214/6 P

[56] References Cited

U.S. PATENT DOCUMENTS

| | | | |
|---|---|---|---|
| 2,997,187 | 8/1961 | Burt | 214/6 P |
| 3,247,981 | 4/1966 | Johnson | 198/422 X |
| 3,323,425 | 6/1967 | Brockmuller | 93/8 |
| 3,373,664 | 3/1968 | Brockmuller | 93/8 |
| 3,756,374 | 9/1973 | Burt et al. | 198/436 X |
| 4,019,639 | 4/1977 | Stobb | 214/6 C |
| 4,073,387 | 2/1978 | Bowser | 214/6 P |

*Primary Examiner*—Robert B. Reeves
*Assistant Examiner*—Douglas D. Watts

*Attorney, Agent, or Firm*—Arthur J. Hansmann

[57] ABSTRACT

An item accumulator and conveyor for accumulating a row of items and then conveying it off to one side for collection and stacking of the row. A first conveyor brings the items to two other conveyors, or to one conveyor having two sections. One of the two sections supports the items at one elevation and accumulates them in a row, and conveyor supports then permit the first section to lower and thereby transfer the items to the second section at a lower level, and the second section then moves the items off to one side. The two conveyor sections include movable support members and they may be at a declining angle so that the items can move under the force of gravity. A stop member is operatively disposed between the incoming conveyor and the other conveyor, such that when the first section is lowered the stop member is effective to preclude the entry of additional items onto the first section, and there is therefore an interconnected system for actuation of the stop member and the lowering of the one conveyor section in synchronization.

7 Claims, 6 Drawing Figures

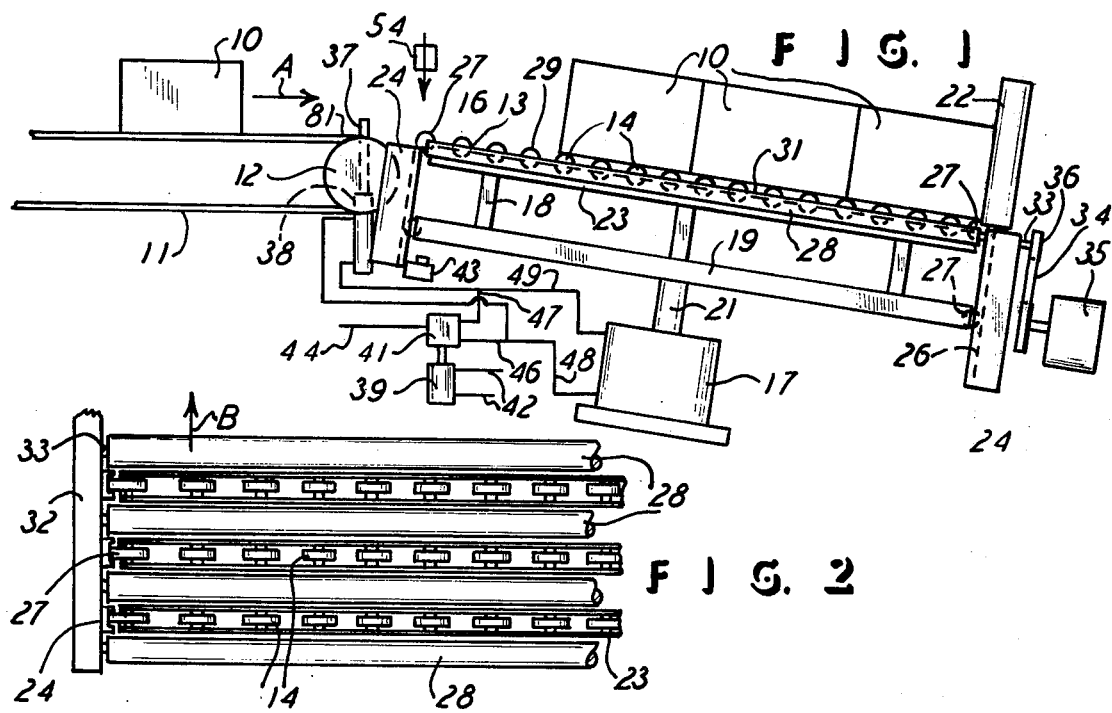
FIG. 1
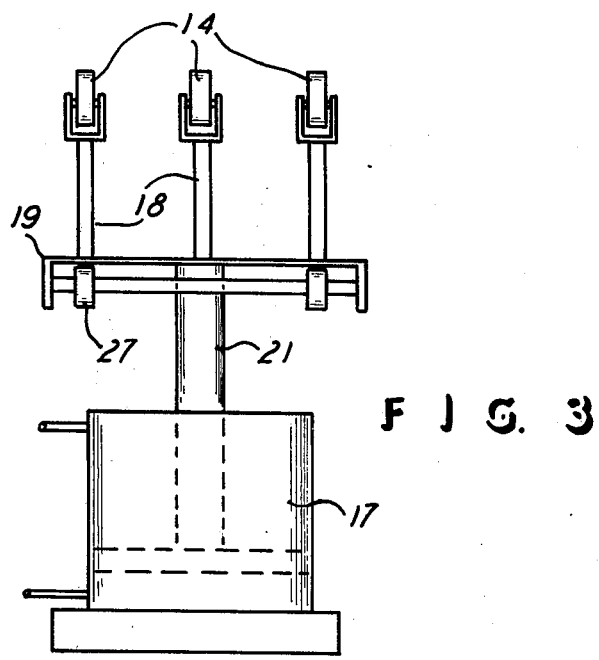
FIG. 2
FIG. 3

ACCUMULATOR AND CONVEYOR FOR A ROW OF ITEMS

This invention pertains to an accumulator and conveyor for a row of items, and, more particularly, it pertains to a conveyor system wherein individual items are separately conveyed to a conveyor which collects the items in a row and then another conveyor moves the items to one side where the rows can be stacked together.

BACKGROUND OF THE INVENTION

The prior art is already aware of various conveyor systems which handle items for supporting and collecting the items in rows thereof and for subsequently stacking the rows. Examples of prior art are found in U.S. Pat. Nos. 3,247,981 and 3,323,425 and 3,373,664, all which show conveyor arrangements for handling items from an stream relationship and placing them into a row. U.S. Pat. No. 3,323,425 shows an arrangement for conveying a stream of items in one direction and then transferring them to another direction at right angles to the first direction, but the items are not finally placed in a row for collection of the rows of items, as they are in the present invention. Further, the aforesaid patents only show two sets of conveyors which simply and fundamentally transfer items from one conveyor of the other, such as by having a first conveyor which moves vertically to a lowered position for transferring its items to the second conveyor at the lower position. However, these patents do not show conveyors with interleaved or interspersed conveyor members which initially support items in one direction of movement and collect the items of thereon and then subsequently support and move the items in another direction, such as in the present invention, U.S. Pat. No. 4,019,639 shows an arrangement of two conveyors which move items in right angle directions, but the conveyors do not actually function to collect a row of items therebetween such that the items first move in a stream on the first conveyor and are collected in a row thereon and are then transferred to a second conveyor and the row of items then being moved under the support of the second conveyor. However, the last-mentioned U.S. patent does show an arrangement of interleaved conveyor members whereby a first conveyor supports the items at one elevation and is then lowered to where the items are supported on the second conveyor at the lower elevation. However, as mentioned, that patent does not show the arrangement of a conveyor system having three actual conveyors with one being an incoming conveyor and the second being a conveyor movable up and down and the third being a conveyor which moves the collected row off to one side and with an item stop member operable between the incoming conveyor and the uprightly movable conveyor and with the operation of the stop being synchronized with the up-and-down movement of the conveyor, all for the purpose of collecting items in a row.

Accordingly, it is a primary object of this invention to improve upon the prior art, as mentioned in the aforesaid. More specifically, it is an object to provide a conveyor system wherein items can be moved in a separated and single form to a up-and-down movable conveyor wherein the items are collected in abutment in a row and then the conveyor can be lowered so that the items can be transferred to still another conveyor for moving the row off to one side for accumulation for like purposes.

Still further, it is an object of this invention to accomplish the aforementioned with a conveyor system which is fully automated and which has the operable elements of the up-and-down movement of the conveyor and the operation of the item stop and the powering of the conveyors themselves all synchronized and automated and integrated into one unit or system.

Still further, the present invention provides a conveyor system wherein the items can be collected in a row on one conveyor which permits the items to move under the force of gravity and therefore come into complete row alignment and contact without creating undue force or using unnecessary power for movement of the items to their row relationship. Further, the aforesaid is accomplished in a system which is adaptable to accomodate an item counter so that when the desired number of items are collected in a row then the following items will be interrupted while the row is being offset to one side for accumulation of the stacks of rows of the items.

Other objects and advantages will become apparent upon reading the following description in light of the accompanying drawings.

BRIEF DESCRIPTION OF THE DRAWINGS

FIG. 1 is a side elevational view of one embodiment of this invention.

FIG. 2 is a top plan view of a fragment of FIG. 1.

FIG. 3 is an enlarged end elevational view of a fragment of FIG. 1.

DETAILED DESCRIPTION OF THE PREFERRED EMBODIMENTS

Figure 4:
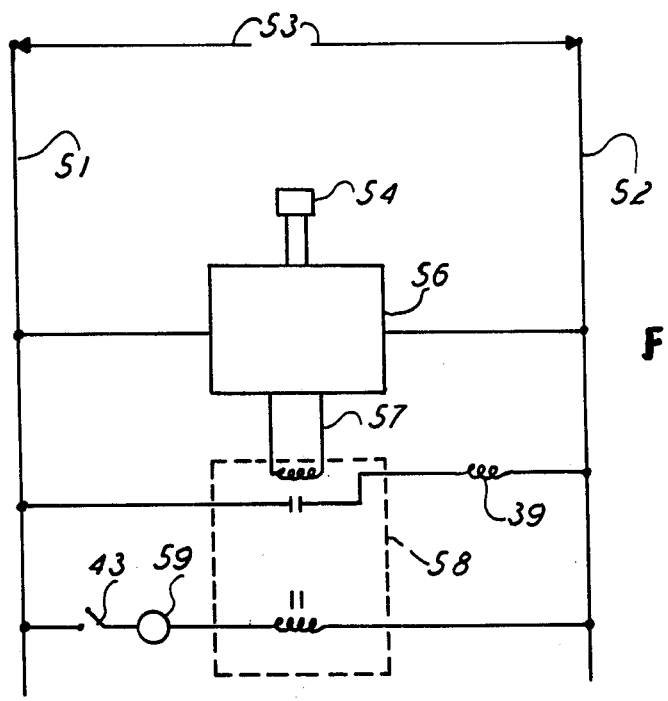
FIG. 4 is an electric schematic view for some of the system elements in FIG. 1.

FIG. 1 shows the basic arrangement of the system for accommodating incoming items or packages 10 and collecting them in a row, as indicated on the right side of FIG. 1, and then when a full row is collected to items 10 are moved off to one side where they can be placed on a pallet or like tilt table, such as that shown in U.S. Pat. No. 4,019,639.

To accomplished the aforesaid, there is an incoming conveyor 11 which is fragmentarily shown and is shown to have a pulley 12 disposed at the juncture between the conveyor 11 and a second conveyor designated 13. The conveyor 13 has a series of wheels or rotatable support members 14 on which the items 10 are supported, and of course the items 10 are transferred from the conveyor 11 and to the conveyor 13 as the items move in the direction of the arrow designated A and under the power of the incoming conveyor 11. Thus, the receiving end 16 of the conveyor 13 is at the elevation of the top of the conveyor 11 so that the items are smoothly and evenly passed between the conveyors 11 and 13 and can be collected on the conveyor 13 as shown where the three items 10 are collected and that may or may not constitute a full row, depending upon the number desired in the row and according to the setting of the control elements, as hereinafter described.

The conveyor 13 is supported for up-and-down movement, and a powered member 17, which is shown to be in the form of a fluid cylinder assembly, is suitably attached to the conveyor 13 for inducing the up-and-down movement mentioned. Thus, the conveyor 13 is seen in FIGS. 1, 2, and 3 to include three rows of wheels 14 which are rotatably supported on standards 18 which is turn are connected by a channel member 19. The fluid cylinder assembly 17 has a piston 21 which is connected with the channel 19, and thus up-and-down movement of the piston or rod 21 causes the channel 19 and thus the wheels 14 to move up and down, at the angle at which the wheels 14 are arranged, and that may be a declining angle as seen from left to right in FIG. 1. In actuality, the declining angle may be from 2 degrees to perhaps 30 degrees so that the items 10 supported on the rotatably-mounted members 14 will flow by gravity to the abutment position seen on the right side in FIG. 1 and thus against a stop 22 which is in a set position for engaging the items 10 and causing them to stop relative to the wheels 14 and thus form in the row relationship shown. There may be a series of members 22 spaced along the length of a conveyor 13, or the member 22 may itself extend therealong and serve as the support or stop as indicated. That is, any conventional arrangement can be employed for stopping the items 10 on the conveyor 13 and in making the provision for the item 22, as mentioned, and one arrangement could be as shown in U.S. Pat. No. 4,019,639 in connection with the conveyor 11 therein.

Thus, the wheels 14 are supported in an elevated position by means of channel members 23, and the entire arrangement of conveyor 13 is therefore under the influence of the cylinder assembly 17 for the up-and-down movement of the conveyor 13 for a purpose hereinafter described. Frame and guide members 24 are stationarily disposed at opposite ends of the conveyor 13 and they present tracks 26 which receive rollers 27 on each end of the channel members 19 and 23, and thus the conveyor 13 is guided in the tracks 26 in the up-and-down movement mentioned.

FIGS. 1 and 2 show that the conveyor 13 with its wheels 14 are interleaved or interspersed relative to cylinders or rollers 28 which from the third conveyor. Further, it will be seen from FIG. 1 that the upper surface 29 of each of the wheels 14 is at an elevation higher than that of the upper surface 31 of the row of rollers 28, in the FIG. 1 position. Thus the items 10 are supported only on the wheels 14 when the items 10 first come onto the conveyor 13. Subsequently, lowering of the conveyor 13 will cause the wheels 14 to move downwardly to an elevation below that of the rollers 28, and thus the items 10 will then be supported on the third conveyor, namely, the rollers 28. The rollers 28 form the third conveyor to have the items move transverse to the longitudinal axes of the rollers 28, that is in the direction of the arrow designated B in FIG. 2. Of course the rollers 28 are rotatably supported in the side frame members 32 by having the rollers shafts 33 supported in the side frame members 32 which exist on each end of the rollers 28.

With the aforesaid arrangement, it will then be seen and understood that the conveyor 13 supports the items 10 for movement in a first direction and by means of the wheels 14, and subsequently the items 10 are supported on the third conveyor formed by the rollers 28 to thus have the items 10 move in a direction transverse to their movement on the conveyor 13, and therefore the row of items 10 can move along the conveyor with the rollers 28 and be collected on a palletizer or the like, such as shown in U.S. Pat. No. 4,019,639.

To assist the movement of the row of items 10 when they are on the conveyor designated 28, there is a motor 35 which drives the rollers 28 through a connecting belt 34 and pulleys 36 which are attached to the roller shafts 33, as shown in FIG. 1. Thus the rollers 28 can be constantly rotating when the system is in use, and immediately upon the lowering of the conveyor 13 the items 10 are transferred to the conveyor 28 which is then powered to move the row of items 10 off to one side and to the palletizer, as mentioned.

FIGS. 1 and 4 show the controls for the three conveyor system described, and FIG. 4 shows the electric schematic for the system. Thus, the controls include a stop 37 which is uprightly movable and can extend above the top of the conveyor 11 to intercept the incoming items 10, and the stop is shown to be of a pneumatic type having an air cylinder 38 which projects and retracts the stop finger designated 37. An electric solenoid 39 is connected with the solenoid valve 41, and electric wires 42 can be utilized for connecting with the solenoid 39, as also shown in FIG. 4. An electric proximity switch 43 is included in the system and is mounted on the frame or track 24 to be engaged and actuated by the lowering of the conveyor 13, and the switch 43 is also shown in FIG. 4.

A fluid supply line 44 connects with the valve 41 which has fluid lines 46 and 47 extending therefrom and connected with lines 48 and 49, respectively, which is turn are connected with the end of the cylinder assembly 17 and the cylinder 38. It will be further noted that the connection with the cylinders 17 and 38 is such that when the pressure is in the line 48, for instance, it places the piston rod 21 in its shown upward position and it also causes the assembly 38 to be at the retracted position so that the stop finger 37 is below the elevation shown in FIG. 1 and is therefore out of the path of the items 10. Conversely, when the fluid pressure is in the line 49, then the rod 21 is retracted and the assembly 38 is extended so that the stop finger of gate 37 is in the upward shown position of FIG. 1. That is, the cylinder assemblies 17 and 38 work in synchronization but in reverse action such that when one is down the other is up all as desired, and conversely.

To further describe the control elements of the system, FIG. 4 is included and is seen that it shows the electric lines 51 and 52 which are connected with incoming power lines 53. A conventional photocell 54 is shown in FIGS. 1 and 4, and it is located at the entrance to the conveyor 13 and includes a conventional type of counter 56 which counts the number of items 10 passing through the photocell beam in the photocell counter combination 54 and 56. FIG. 4 further shows that the photocell counter output lines 57 connect to a latching relay 58 which is thus energized by the counter, 56, and the solenoid 39 is also shown in the schematic in FIG. 4 along with the showing of the proximity switch 43. There is also an electric timer 59 in the electric system as shown. With this arrangement, one skilled in the art will readily comprehend and understand that the counter 56 can be set for a selected number of items passing thereby and thus forming the row of items 10 on the conveyor 13. When the number is reached, the latching relay will be energized by the counter and will thus energize the solenoid valve which in turn controls the fluid lines for lowering the conveyor 13 to transfer the items 13 to the conveyor designated 28. The conveyor 13 is lowered to a point where it actuates the switch 43 and thus the electric timer 59 is energized and operates for a desired length of time. The action also immediately causes the fluid cylinder assembly 38 to be energized to present the stop finger 37 to the incoming items 10, all such that the lowering of conveyor 13 also causes the raising of the stop gate 37 in sychronization. When the timer 59 has expired, then the relay 58 will again return to its original position and so will the solenoid valve 39 which is normally set in one position and is electrically energized to the other position mentioned. That switching action will of course cause the assemblies 17 and 38 to be powered in the opposite direction so that the conveyor 13 is again placed in its elevated position and the gate 37 is lowered an another row of items 10 is thus collected on the conveyor 13 while the first row has been transferred to the conveyor 28 and is powered to one side of the location for the originally collected row.

Figure 6:
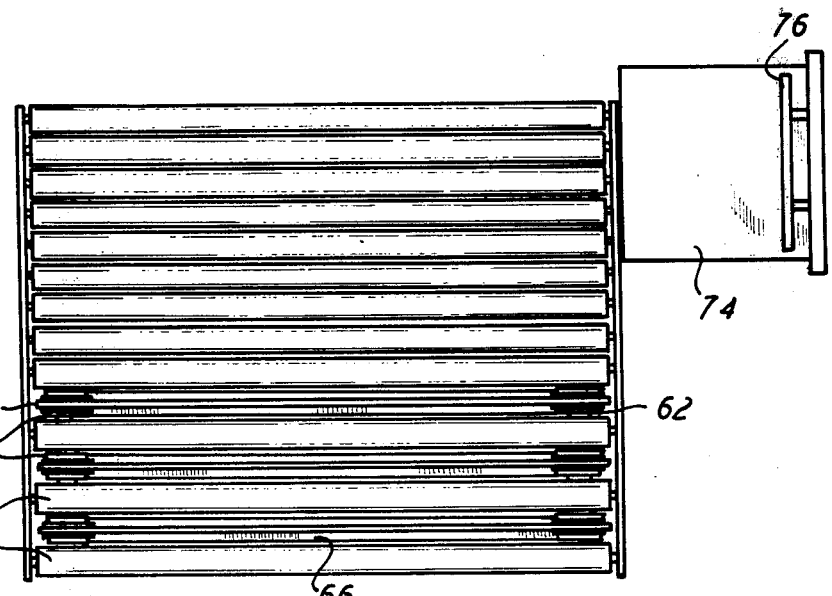
FIG. 6 is a top plan view of a portion of FIG. 5 and with a pallet tilt box added thereto.
Figure 5:
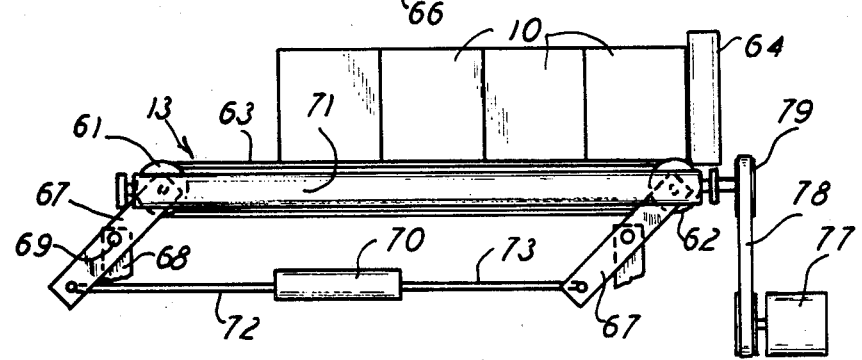
FIG. 5 is a side elevational view of another embodiment of this invention.

FIGS. 5 and 6 show a somewhat different arrangement for the lowering of the conveyor 13, and here it will be seen that the conveyor designated 13 consists of the spaced-apart pulleys 61 and 62 and a conveyor belt 63 therebetween. Thus the items 10 are transferred from the incoming conveyor 11 and onto the second conveyor belt 63 to be collected in the row as shown in FIG. 5 and against the upright stop 64, as explained above and as indicated with regard to the referenced patent mentioned. The conveyor 13 may have a support plate 66 extending underneath the upper run of the conveyor belt 63 so that the items 10 are firmly upwardly supported on the conveyor 13. However, the conveyor belts 63 are shown to be three in number and are movable up and down by means of pivot arms 67 which connect to the conveyor 13 at each location of the pulleys 61 and 62. That is, the arms 67 are pivotally supported on frame members 68 and pivot about the support pins 69 and the upper ends of the arms 67 rotatably support the pulleys 61 and 62 and move them up and down in accordance with the pivot of the arm 67. An air cylinder 70 has rods 72 and 73 extending therefrom to connect the lower end of the arms 67 and thus induce the pivot of the arms 67 and the up-and-down movement of the conveyor 13 so that the items 10 can be transferred from the conveyor belt 63 and to the third conveyor roller members 71 which are interspersed with the belt 63, all as shown in FIG. 6. FIG. 6 further shows the tiltable platform or palletizer box 74 which has a pallet 76 support thereon, and thus the row of items 10 can be aligned with the box 74 and moved onto the box 74 and against the pallet 76 which will then be tilted through 90 degrees to support the row of items in an upstanding stack. That arrangement and action can be as fully shown and described in referenced U.S. Pat. No. 4,019,639. Again, as in connection with the second embodiment, the third conveyor with its rollers 71 can be continuously powered by a motor 77 which is connected through a belt 78 and roller pulleys 79 to each of the rollers 71 which are thus constantly rotating while the equipment is operating to thereby convey the items 10 to one side and preferrably into alignment with the tilt box 74, as described.

Accordingly, in each embodiment, the arrangement is such that the incoming conveyor 11 has a terminal end 81 disposed in end-to-end item movement communication with the conveyor 13, and the stop gate 37 is interposed therebetween. The conveyors 13 and 28 can actually be considered to be one conveyor with the two sections consisting mainly to the wheels 14 and the rollers 28 which support and transfer and convey the items sequentially to thereby collect each row and transfer it at right angles to its original direction of movement. Of course the orientation of the support members 14 of the second conveyor is aligned with the first conveyor 11 to have the items 10 move in one direction between the conveyor 11 and the support members 14. Further, the time interval of operation of the timer 59 is such that the first conveyor section with its support members 14 will be lowered for a time sufficient to cause the second conveyor section with the rollers 28 to move the items 10 out of the alignment of the incoming conveyor 11 so that the first row of items 10 will be moved out of the way before another item 10 is transferred into the second conveyor, and thus the time delay for the gate 37 and the up-and-down movement of the members 14 are synchronized with the time row offsetting the for of items 10, as mentioned.

What is claimed is:

1. An accumulator and conveyor for a row of items, comprising a first conveyor for supporting and conveying items along a path of conveyance and having a terminal portion defining a terminal location of positioning the items, a second conveyor disposed in end-to-end item-movement communication with said terminal portion of said first conveyor for receiving the items from said first conveyor and for accumulating a row of several of the items, a stop movably disposed at said terminal end of said first conveyor for interrupting the movement of the items onto said second conveyor, said second conveyor including two sections of item-supporting members and with said two sections being disposed in said path of conveyance of said first conveyor, a first one of said sections being at an elevation higher than the other of said sections and presenting a first item-receiving conveyor section, said two sections including item-supporting members angularly oriented relative to each other for conveying the items in respectively different directions corresponding to the angulation between said two sections, the orientation of said supporting members of said first section being aligned with said first conveyor to be adapted to receive the items directly from said first conveyor and convey the items in the direction of said path of conveyance of the items on said first conveyor, an uprightly movable support connected with one of said two sections for positioning said first section at an elevation lower than the other of said sections for transferring the items from said first section to the said other section, powered mechanisms respectively connected with each of said uprightly movable support and said stop for actuating the latter two, a power control system operatively interconnected with an interconnecting said powered mechanisms and including a switch for sychronized actuation of said powered mechanisms and thus sequentially first activating said stop and then activating said uprightly movable support.

2. The accumulator and conveyor for a row of items as claimed in claim 1, wherein said powered mechanism connected with said uprightly movable support is a fluid cylinder assembly.

3. The accumulator and conveyor for a row of items as claimed in claim 1, wherein said power control system includes an item counter for counting the items moving onto said second conveyor.

4. The accumulator and conveyor for a row of items as claimed in claim 1, wherein said power control system includes a timer for imparting a time element in the operation of said powered mechanisms.

5. The accumulator and conveyor for a row of items as claimed in claim 1, wherein said second conveyor is disposed at a declining angle extending from said first conveyor, for movement of the items on said second conveyor and under the force of gravity.

6. The accumulator and conveyor for a row of items as claimed in claim 5, including drive mechanism operatively connected with said item-supporting members of said other section for powering said item-supporting members of said other section when the items are supported thereon.

7. The accumulator and conveyor for a row of items as claimed in claim 6, wherein said item supporting members are spaced-apart rollers and cylinders in alternating sequence adjacent each other and exclusively on respective ones of said two sections.

* * * * *